(12) United States Patent
Chiang et al.

(10) Patent No.: US 11,101,467 B2
(45) Date of Patent: Aug. 24, 2021

(54) METAL-ION SECONDARY BATTERY

(71) Applicant: Industrial Technology Research Institute, Hsinchu (TW)

(72) Inventors: Chien-Chih Chiang, New Taipei (TW); Kuang-Yao Chen, Ji'an Township (TW); Chun-Hsing Wu, Taipei (TW); Chang-Chung Yang, Taipei (TW); Wen-Sheng Chang, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 139 days.

(21) Appl. No.: 15/671,402

(22) Filed: Aug. 8, 2017

(65) Prior Publication Data

US 2018/0083287 A1 Mar. 22, 2018

(30) Foreign Application Priority Data

Sep. 22, 2016 (TW) ................... 105130574

(51) Int. Cl.
*H01M 4/70* (2006.01)
*H01M 10/054* (2010.01)
(Continued)

(52) U.S. Cl.
CPC ............ *H01M 4/70* (2013.01); *H01M 4/133* (2013.01); *H01M 4/134* (2013.01); *H01M 4/38* (2013.01);
(Continued)

(58) Field of Classification Search
CPC ........ H01M 4/133; H01M 4/134; H01M 4/38; H01M 4/463; H01M 4/587; H01M 4/663; H01M 4/667; H01M 4/70; H01M 4/80; H01M 2004/021; H01M 2004/028; H01M 10/054; H01M 10/0569; H01M 2300/0028; H01M 2300/0045
See application file for complete search history.

(56) References Cited

U.S. PATENT DOCUMENTS

| | | |
|---|---|---|
| 4,740,990 A | 4/1988 | Radev et al. |
| 5,169,508 A | 12/1992 | Suzuki et al. |

(Continued)

FOREIGN PATENT DOCUMENTS

| | | |
|---|---|---|
| CN | 101394002 A | 3/2009 |
| CN | 102214838 A | 10/2011 |

(Continued)

OTHER PUBLICATIONS

AZoM. "Graphite (C)—Classifications, Properties & Applications." AZoM.com, Sep. 10, 2002, https://www.azom.com/article.aspx?ArticleID=1630. (Year: 2002).*

(Continued)

*Primary Examiner* — Brittany L Raymond
(74) *Attorney, Agent, or Firm* — Birch, Stewart, Kolasch & Birch LLP (57) ABSTRACT

A metal-ion secondary battery is provided. The metal-ion secondary battery includes a positive electrode. The positive electrode includes at least one current-collecting layer and at least one active layer, wherein the current-collecting layer and the active layer are mutually stacked, and the current-collecting layer has at least one first through-hole.

17 Claims, 11 Drawing Sheets

(51) Int. Cl.
*H01M 4/133* (2010.01)
*H01M 4/80* (2006.01)
*H01M 4/38* (2006.01)
*H01M 4/134* (2010.01)
*H01M 4/46* (2006.01)
*H01M 4/587* (2010.01)
*H01M 4/02* (2006.01)
*H01M 4/66* (2006.01)
*H01M 10/0569* (2010.01)

(52) U.S. Cl.
CPC ........... *H01M 4/463* (2013.01); *H01M 4/587* (2013.01); *H01M 4/80* (2013.01); *H01M 10/054* (2013.01); *H01M 4/663* (2013.01); *H01M 10/0569* (2013.01); *H01M 2004/021* (2013.01); *H01M 2004/028* (2013.01); *H01M 2300/0028* (2013.01); *H01M 2300/0045* (2013.01)

(56) References Cited

U.S. PATENT DOCUMENTS

| | | | |
|---|---|---|---|
| 6,343,003 B1 | 1/2002 | Sakata et al. | |
| 6,522,523 B2 | 2/2003 | Takatomi et al. | |
| 8,329,008 B2 | 12/2012 | Maekawa et al. | |
| 8,357,468 B2* | 1/2013 | Exnar | H01M 4/136 252/182.1 |
| 8,691,441 B2* | 4/2014 | Zhamu | H01M 4/13 252/502 |
| 8,956,509 B2 | 2/2015 | Brault et al. | |
| 9,253,827 B2 | 2/2016 | Coleman et al. | |
| 2003/0224242 A1* | 12/2003 | Kaito | H01M 2/08 429/94 |
| 2010/0285353 A1 | 11/2010 | Katayama et al. | |
| 2010/0328846 A1 | 12/2010 | Lee et al. | |
| 2011/0244307 A1* | 10/2011 | He | H01M 4/70 429/152 |
| 2012/0082904 A1* | 4/2012 | Brown | H01M 4/463 429/338 |
| 2012/0088139 A1 | 4/2012 | Sakai et al. | |
| 2012/0289775 A1 | 11/2012 | Murata | |
| 2013/0115527 A1* | 5/2013 | Au | H01M 8/8605 429/405 |
| 2013/0230783 A1* | 9/2013 | Amine | H01M 2/162 429/405 |
| 2014/0106193 A1 | 4/2014 | Kim et al. | |
| 2014/0127574 A1* | 5/2014 | Ohmori | H01M 4/80 429/211 |
| 2014/0295291 A1* | 10/2014 | Kondo | H01M 4/8668 429/403 |
| 2015/0249261 A1* | 9/2015 | Dai | H01M 10/054 429/336 |
| 2016/0322621 A1* | 11/2016 | Umeyama | H01M 2/1686 |
| 2017/0263933 A1* | 9/2017 | Akikusa | H01M 4/485 |

FOREIGN PATENT DOCUMENTS

| | | |
|---|---|---|
| CN | 102473893 A | 5/2012 |
| CN | 104078723 A | 10/2014 |
| CN | 104737333 A | 6/2015 |
| CN | 105810895 A | 7/2016 |
| EP | 2040320 A1 | 3/2009 |
| EP | 2919300 A1 | 9/2015 |
| JP | 2003-123767 A | 4/2003 |
| JP | 2007-214086 A | 8/2007 |
| WO | WO 2015/115531 A1 | 8/2015 |

OTHER PUBLICATIONS

Extended European Search Report for European Application No. 17192136.4, dated Jan. 2, 2018.
Hudak, "Chloroaluminate-Doped Conducting Polymers as Positive Electrodes in Rechargeable Aluminum Batteries", The Journal of Physical Chemistry, 2014, vol. 118, pp. 5203-5215.
Li et al., "Flexible graphene-based lithium ion batteries with ultra-fast charge and discharge rates", PNAS, Oct. 23, 2012, vol. 109, No. 43, pp. 17360-17365.
Lin et al., "An ultrafast rechargeable aluminium-ion battery", Nature, Apr. 16, 2015, vol. 520, pp. 325-328, total 16 pages.
Office Action for TW 105130574 dated May 19, 2017.
Sun et al., "A new aluminium-ion battery with high voltage, high safety and low cost", Chemical Communications, 2015, vol. 51, pp. 11892-11895.
Wu et al., "Geometry and fast diffusion of $AlCl_4$ cluster intercalated in graphite", Electrochimica Acta, 2016, vol. 195, pp. 158-165.
Office Action dated Mar. 26, 2019 in corresponding Chinese application No. 201611012636.3.
An Office Action issued in corresponding Chinese application No. 201611012636.3 dated Dec. 30, 2019.

* cited by examiner

METAL-ION SECONDARY BATTERY

CROSS REFERENCE TO RELATED APPLICATIONS

The application is based on, and claims priority from, Taiwan Application Serial Number 105130574, filed on Sep. 22, 2016, the disclosure of which is hereby incorporated by reference herein in its entirety.

TECHNICAL FIELD

The technical field relates to an energy storage device, and in particular to a metal-ion secondary battery.

BACKGROUND

Aluminum is the most abundant metal on earth and the electronic device based on aluminum has the advantage of low cost. In the application of energy storage device, aluminum and compounds thereof, in comparison with lithium and cadmium, have lower biological toxicity and can serve as environmentally friendly energy storage materials. Further, aluminum has a low flammability and low electronic redox properties, such that an aluminum-ion battery might offer significant safety improvements.

Given the foregoing enhanced theoretical capacity of an aluminum-ion battery, are aluminum-ion battery constructions are desirable in that they may feasibly and reliably provide enhanced battery performance, such as enhanced capacity and discharge voltage. The capacity of an aluminum-ion battery is proportional to the amount of graphite in the aluminum-ion battery. Theoretically, the capacity of the aluminum-ion battery can be increased by increasing the amount of the graphite. In fact, due to the greater amount and thickness of the graphite layer, the graphite located in the deeper position of the graphite layer may not be infiltrated by the ionic liquid, resulting in the capacity of the aluminum-ion battery not being able to be enhanced any further.

Therefore, there is a need to develop a novel battery, which optimizes the utilization rate of graphite in order to increase the capacity and achieve rapid charging and discharging.

SUMMARY

According to embodiments of the disclosure, the disclosure provides an energy storage device, such as metal-ion secondary battery. The metal-ion secondary battery can include a positive electrode, wherein the positive electrode includes at least one current-collecting layer and at least one active layer, wherein the current-collecting layer and the active layer are mutually stacked, and the current-collecting layer has at least one first through-hole.

A detailed description is given in the following embodiments with reference to the accompanying drawings.

DETAILED DESCRIPTION

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

One embodiment of the disclosure provides a metal-ion secondary battery. The metal ion battery includes a positive electrode. Due to the light and thin active layer of the positive electrode and the design of lamination of the active layer and the current-collecting layer, a pathway for the electrolyte (such as ionic liquid) is provided, resulting in the active layer being able to be infiltrated rapidly by the ionic liquid, and the electrolyte exhibiting an improved current collection capability due to the light and thin active layer. Therefore, the metal-ion secondary battery of the disclosure can exhibit high specific capacity and storage capacity per volume.

Figure 1:
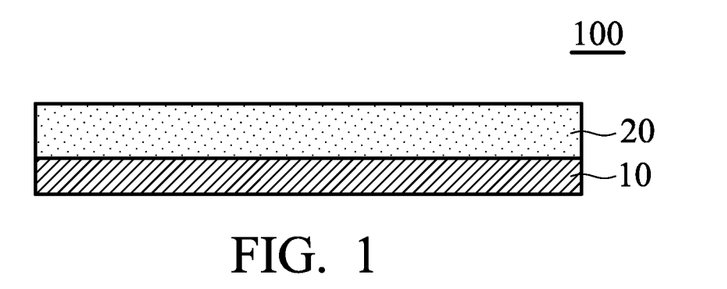
FIG. 1 is a schematic view of the positive electrode according to embodiments of the disclosure.
Figure 2A:
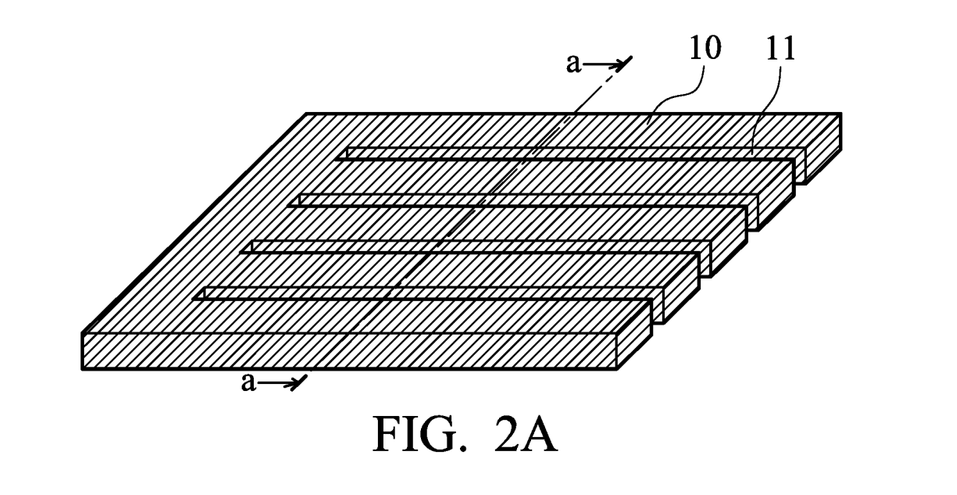
FIG. 2A is a schematic view of the current-collecting layer of the positive electrode shown in FIG. 1.
Figure 2B:
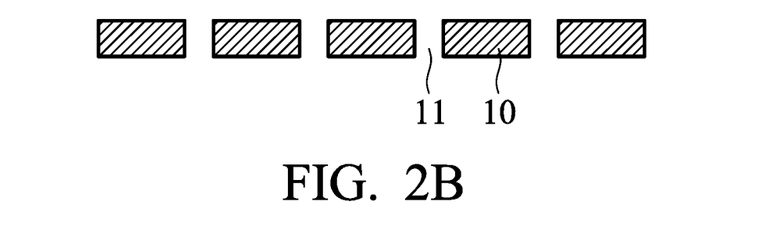
FIG. 2B is a cross-sectional view along line a-a of the current-collecting layer shown in FIG. 2A.
Figure 3:
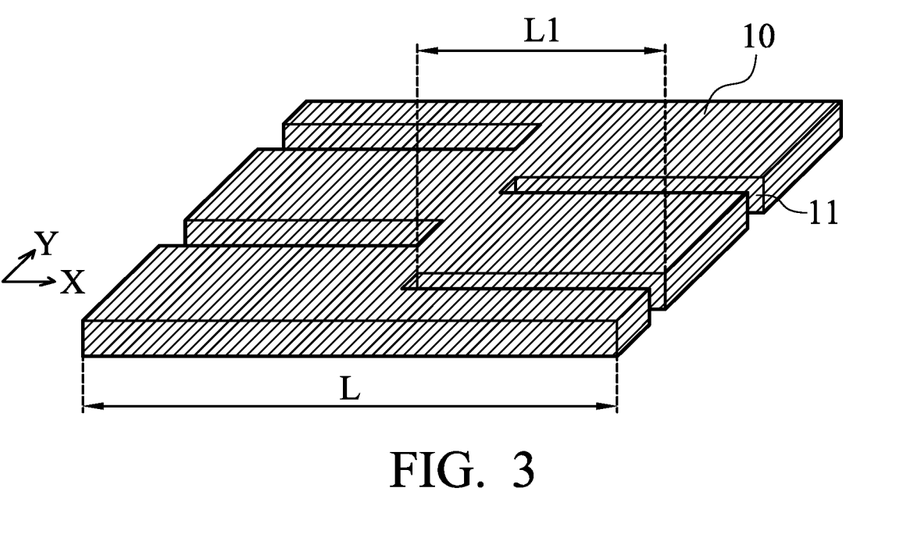
FIGS. 3 and 4 are schematic views of the current-collecting layer of the positive electrode shown in FIG. 1 according to some embodiments of the disclosure.
Figure 4:
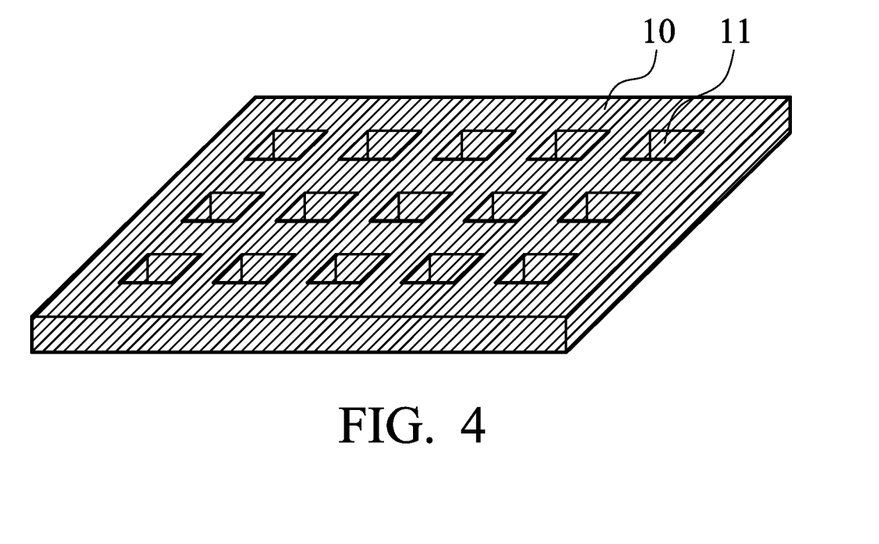

FIG. 1 is a schematic view of the positive electrode 100 according to embodiments of the disclosure. As shown in FIG. 1, the positive electrode 100 includes a current-collecting layer 10 and an active layer 20 disposed on a surface of the current-collecting layer 10. FIG. 2A is a schematic view of the current-collecting layer 10 of the positive electrode 100 shown in FIG. 1. The current-collecting layer 10 can have at least one first through-hole 11. FIG. 2B is a cross-sectional view along line a-a of the current-collecting layer 10 shown in FIG. 2A. As shown in FIG. 2B, the first through-hole 11 can be a through-hole passing through the current-collecting layer 10. As a result, the electrolyte can flow into the active layer via the first through-hole 11. Namely, due to the design of the through-hole, a pathway for the electrolyte, which flows into the electrode, is provided. As a result, the diffusion of the electrolyte is improved, the active layer is infiltrated rapidly by the electrolyte, and the utilization rate of the active material located in the deeper position of the active layer is increased. Therefore, the metal-ion secondary battery of the disclosure can exhibit high storage capacity per volume. In one embodiment, the first through-hole 11 can have a porosity P1 between 0.1% and 50%, such as between 1% and 20%. The porosity P1 can be measured by the following equation: $P1=A1/(A1+A2)\times 100\%$, wherein A1 is the area of the first through-hole, and A2 is the area of the current-collecting layer. When the porosity is too low, the total capacity of the battery of the disclosure is increased slightly. Conversely, when the porosity is too high, the conductive efficiency of the current-collecting layer is affected adversely. The shape of the first through-hole 11 is not limited and can be a square hole, a rectangular hole, a round hole, a polygon-shaped hole, irregular-geometric-shaped, or a combination thereof. As shown in FIG. 2A, the first through-hole 11 can be rectangle. FIGS. 3 and 4 are schematic views of the current-collecting layer 10 of the positive electrode 100 shown in FIG. 1 according to some embodiments of the disclosure. The through-hole shown in FIGS. 3 and 4 can be rectangular (i.e. the shape of through-hole shown in FIGS. 3 and 4 is the same as the shape of the through-hole shown in FIG. 2), and the size and/or distribution of the through-hole shown in FIGS. 3 and 4 can be different from the through-hole shown in FIG. 2. For example, the through-hole can be open, i.e. the through-hole is not surrounded by the current-collecting layer 10, as shown in FIG. 3. The through-hole can be closed, i.e. the through-hole is surrounded by the current-collecting layer 10, as shown in FIG. 4. In one embodiment, the first through-hole can have an aspect ratio between 1:1.5 and 1:10000, such as between 1:1.5 and 1:500, between 1:100 and 1:1000, or 1:1000 and 1:10000. In another embodiment, the ratio of the total of the length L1 (along a cross-section line parallel to X direction or Y direction) of the first through-hole 11 to the length L (in the same direction of the cross-section line) of the current-collecting layer 10 can be greater than or equal to 0.3 (as shown in FIG. 3). The aforementioned current-collecting layer can include metal foil (such as aluminum foil), conductive adhesive (such as silver adhesive), conductive polymer, carbon paper, alloy, or carbon cloth. The thickness of the current-collecting layer can be from 1 μm to 500 μm, such as from 3 μm to 250 μm, or from 5 μm to 20 μm.

Figure 5A:
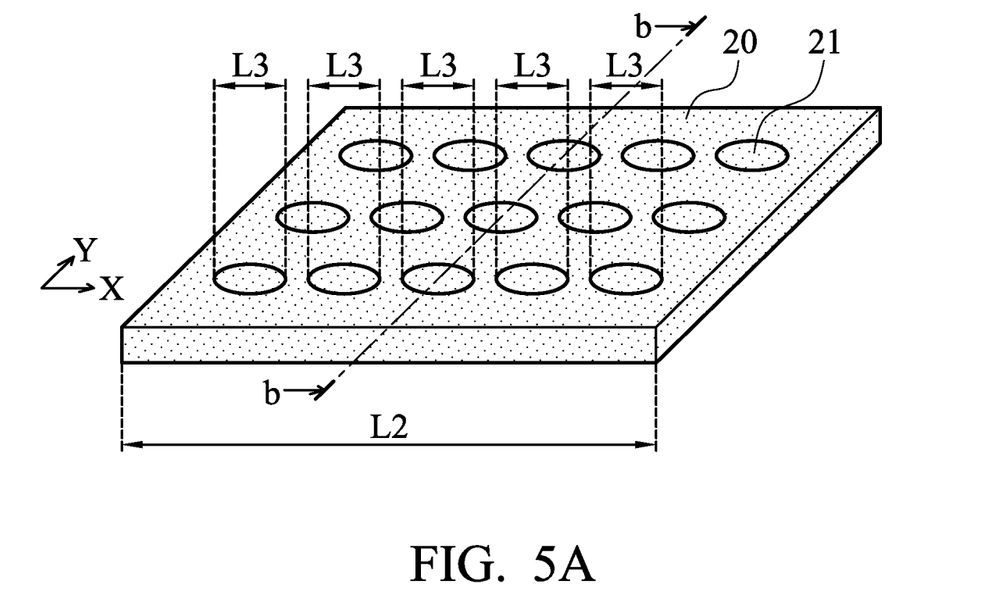
FIG. 5A is a schematic view of the active layer of the positive electrode as shown in FIG. 1.
Figure 5B:
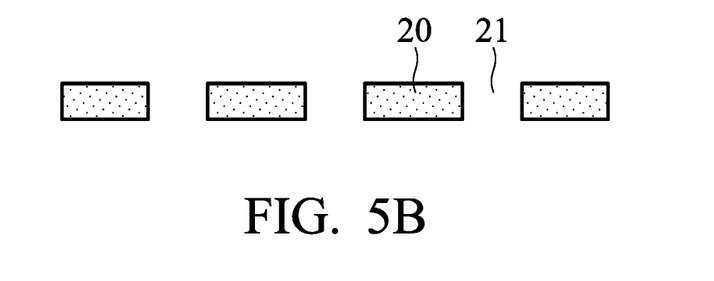
FIG. 5B is a cross-sectional view along line b-b of the active layer as shown in FIG. 5A.

According to embodiments of the disclosure, FIG. 5A is a schematic view of the active layer 20 of the positive electrode 100 shown in FIG. 1. As shown in FIG. 5A, the active layer 20 can have at least one second through-hole 21. FIG. 5B is a cross-sectional view along line b-b of the active layer shown in FIG. 5A. As shown in FIG. 5B, the second through-hole 21 can be a through-hole passing through the active layer 20. As a result, the area of the active layer 20 is increased and the electrolyte can contact the surface of the active layer 20 via the second through-hole 21. Namely, due to the design of the through-hole, a pathway for the electrolyte, which flows into the electrode, is provided. As a result, the diffusion of the electrolyte is improved, the active layer is infiltrated rapidly by the electrolyte, and the utilization rate of the active material located in the deeper position of the active layer is increased. Therefore, the metal-ion secondary battery of the disclosure can exhibit high total capacity. In one embodiment, the second through-hole 21 can have a porosity P2 between 1% and 50%, such as between 1% and 30%. The porosity P2 can be measured by the following equation: $P2=A3/(A3+A4)\times 100\%$, wherein A3 is the area of the second through-hole, and A4 is the area of the active layer. When the porosity is too low, the total capacity of the battery of the disclosure is increased slightly. Conversely, when the porosity is too high, the amount of active material is reduced thereby reducing the total capacity. The shape of the second through-hole 21 is not limited and can be square, rectangular, round, polygonal, irregular-geometric-shaped, or a combination thereof. As shown in FIG. 5A, the second through-hole 21 can be circular. The size and/or the distribution of the through-hole can be varied. For example, the through-hole can be open (i.e. the through-hole is not surrounded by the active layer) or closed (i.e. the through-hole is surrounded by the active layer, as shown in FIG. 5A).

In one embodiment, the second through-hole can have an aspect ratio between 1:1.5 and 1:10000, such as between 1:1.5 and 1:500, between 1:100 and 1:1000, or 1:1000 and 1:10000. In another embodiment, the ratio of the total of the length L3 (along a cross-section line parallel to X direction or Y direction) of the second through-hole 21 to the length L2 (in the same direction of the cross-section line) of the active layer 20 can be greater than or equal to 0.3 (as shown in FIG. 5A). The amount of active material of the active layer can be between 0.1 mg/cm2 and 10 mg/cm2. The active material can include graphite material, such as expanded graphite, natural graphite, artificial graphite, mesophase carbon microbeads, pyrolytic graphite, layered graphene, foamed graphite, flake graphite, or a combination thereof. It should be noted that the graphite material having a high specific surface area can provide valid intercalations between the graphite layers, thereby increasing the specific capacity. The specific surface area of the graphite material can be larger than 250 $m^2/g$, such as between 5 $m^2/g$ and 100 $m^2/g$. The amount of graphite material can be between 0.1 $mg/cm^2$ and 10 $mg/cm^2$, such as between 0.3 $mg/cm^2$ and 3 $mg/cm^2$. When the amount of graphite material is too high, the utilization rate of the graphite material located in the deeper position of the active layer is reduced and the resistance is increased. Conversely, when the amount of graphite material is too low, the total capacity of the graphite is reduced, and the battery has a low energy density by weight. In one embodiment, the aforementioned active material can further include carbon material (such as carbon nanotube, or graphene), metal nanowire (such as silver nanowire), metal microwire (such as copper wire, or nickel wire), transition metal nanoparticle (such as iron, cobalt, or nickel), or transition metal microparticle (such as iron, cobalt, or nickel), or a combination thereof.

Figure 6A:
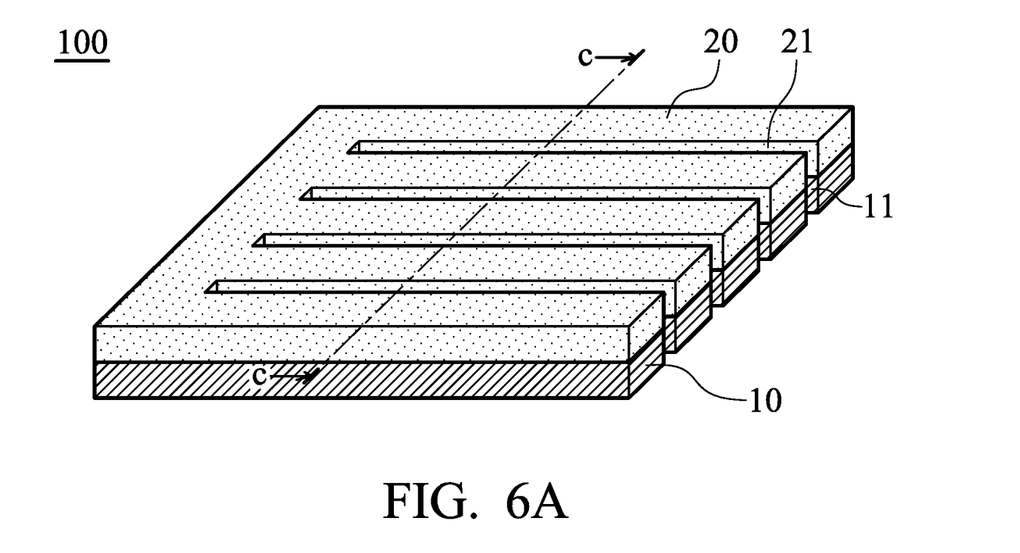
FIG. 6A is a schematic view of the positive electrode shown in FIG. 1.
Figure 6B:
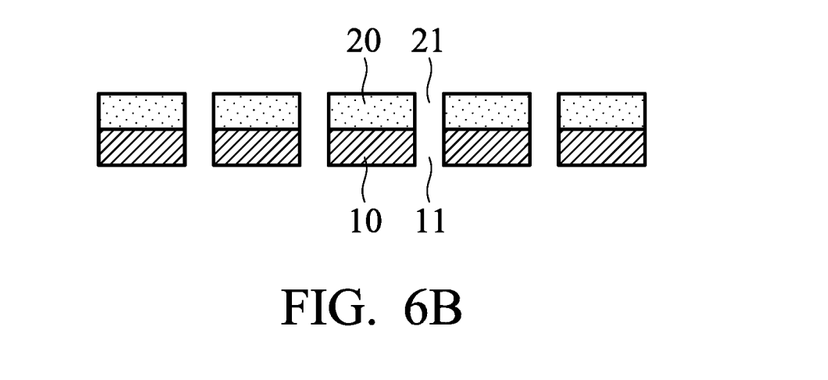
FIG. 6B is a cross-sectional view along line c-c of the positive electrode shown in FIG. 6A
Figure 7A:
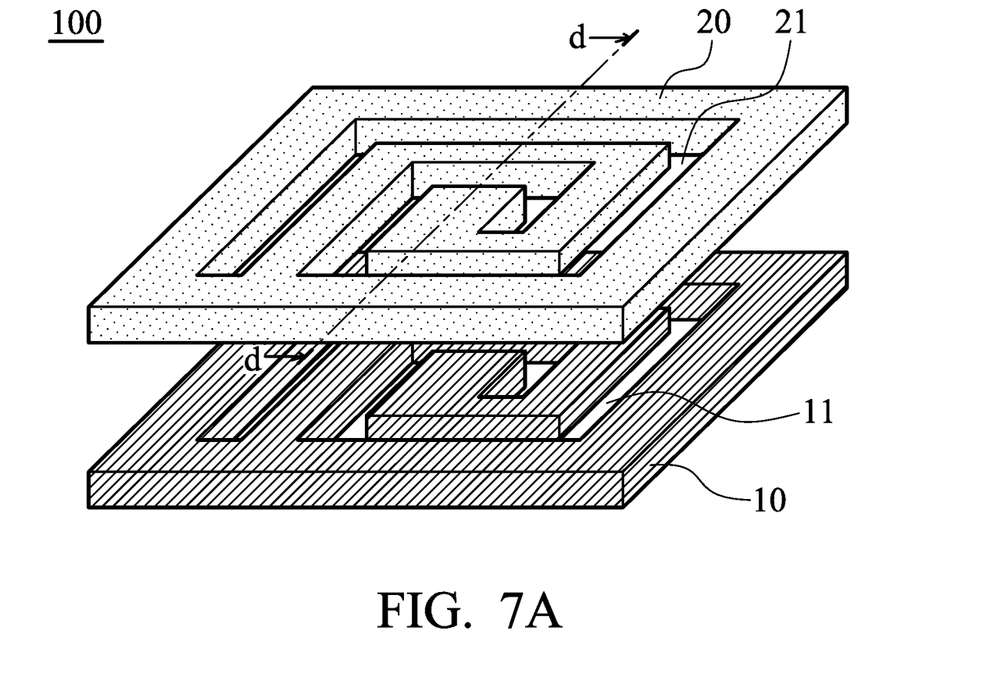
FIG. 7A is a schematic view of the positive electrode shown in FIG. 1 according to another embodiment.
Figure 7B:
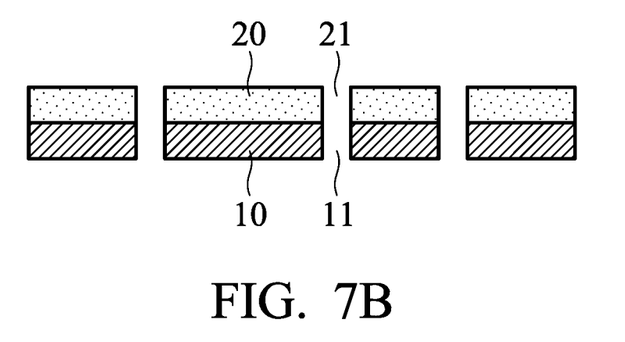
FIG. 7B is a cross-sectional view along line d-d of the positive electrode shown in FIG. 7A.

According to embodiments of the disclosure, FIG. 6A is a schematic view of the positive electrode 100 shown in FIG. 1. As shown in FIG. 6A, the positive electrode 100 includes a current-collecting layer 10 and an active layer 20 disposed on a surface of the current-collecting layer 10, wherein the current-collecting layer 10 can have at least one first through-hole 11, and the active layer 20 can have at least one second through-hole 21. FIG. 6B is a cross-sectional view along line c-c of the positive electrode 100 shown in FIG. 6A. As shown in FIG. 6B, the first through-hole 11 can be a through-hole passing through the current-collecting layer 10, and the second through-hole 21 can be a through-hole passing through the active layer 20. The projection of the first through-holes 11 onto a reference plane parallel to the current-collecting layer 10 and the active layer 20 completely overlaps with the projection of the second through-holes 21 onto the reference plane. As a result, the electrolyte can contact the active layer via the first through-holes 11 and the second through-holes 21, thereby facilitating the diffusion of the electrolyte and facilitating the infiltration of electrolyte into the active layer. Therefore, the total capacity of the battery of the disclosure can be increased. According to other embodiments of the disclosure, the projection of the first through-holes 11 onto a reference plane parallel to the current-collecting layer 10 and the active layer 20 can partially overlap or not overlap with the projection of the second through-holes 21 onto the reference plane. FIG. 7A is a schematic view of the positive electrode 100 shown in FIG. 1 according to another embodiment, and FIG. 7B is a cross-sectional view along line d-d of the positive electrode shown in FIG. 7A. As shown in FIGS. 6A and 7A, the shapes of the first through-hole 11 and the second through-hole 21 are not limited, and the first through-hole 11 and the second through-hole 21 can each independently be a square hole, a rectangle-shaped hole, a round hole, a polygon-shaped hole, irregular-geometric-shaped, or a combination thereof. The shape of the first through-hole 11 can be the same as or different than the shape of the second through-hole 21.

Figure 8:
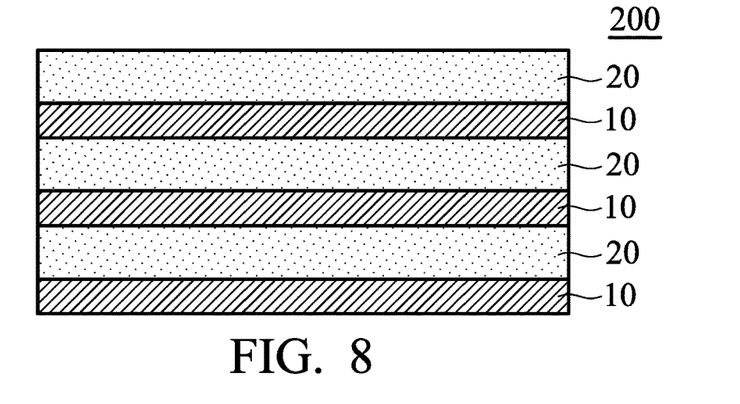
FIGS. 8 and 9 are schematic views of the positive electrode according to embodiments of the disclosure.

According to an embodiment of the disclosure, the positive electrode can include at least one current-collecting layer and at least one active layer, and the current-collecting layer and the active layer are mutually stacked. For example, the stack of current-collecting layers and active layers can include a plurality of basic units, wherein the basic unit is constituted by the current-collecting layer and the active layer disposed on the surface of the current-collecting layer. Therefore, the stack can have a laminated structure represented by active layer /current-collecting layer // . . . //active layer /current-collecting layer. FIG. 8 is a schematic view of the positive electrode 200 according to embodiments of the disclosure. As shown in FIG. 8, the positive electrode 200 consists of a plurality of basic units stacked on each other, wherein the basic unit is constituted by the current-collecting layer 10 and the active layer 20 disposed on a surface of the current-collecting layer 10. Furthermore, the stack of current-collecting layers and active layers can include a plurality of basic units, wherein the basic unit is constituted by one current-collecting layer and two active layers, and wherein one active layer is disposed on the top surface of the current-collecting layer, and the other active layer is disposed on the bottom surface of the current-collecting layer. Therefore, the stack can have a laminated structure represented by active layer /current-collecting layer /active layer // . . . //active layer /current-collecting layer /active layer.

Figure 9:
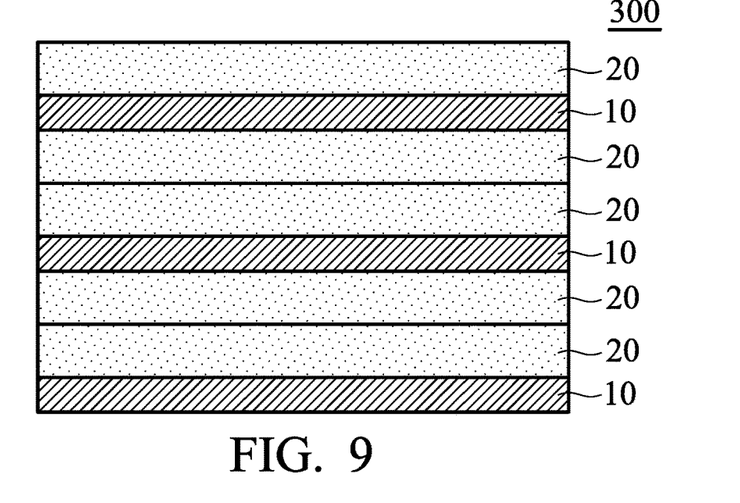

Moreover, the stack of current-collecting layers and active layers can include first basic units and second basic units, wherein the first basic unit (active layer /current-collecting layer) is constituted by one current-collecting layer and one active layer disposed on the current-collecting layer, and the second basic unit (active layer /current-collecting layer /active layer) is constituted by one current-collecting layer and two active layers (one active layer disposed on the top surface of the current-collecting layer, and the other active layer disposed on the bottom surface of the current-collecting layer). Therefore, the stack can have a laminated structure represented by active layer /current-collecting layer /active layer //active layer /current-collecting layer /active layer //active layer /current-collecting layer, as shown in FIG. 9. According to an embodiment of the disclosure, the current-collecting layers of the aforementioned stacks may independently include or not include first through-holes, and the active layers of the aforementioned stacks may independently include or not include second through-holes as necessary. Suitable materials for the current-collecting layer and active layer are the same as defined above, and thus, no further discussion is needed.

Figure 10:
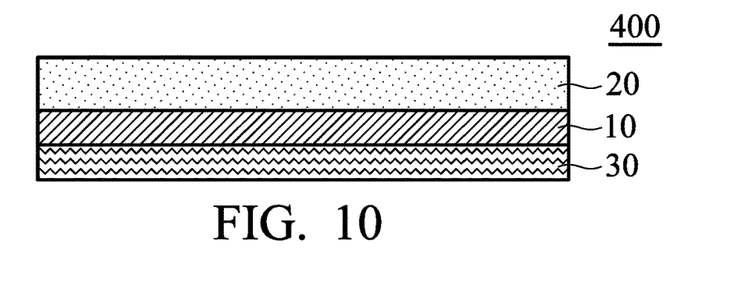
FIG. 10 is a schematic view of the positive electrode according to embodiments of the disclosure.
Figure 11A:
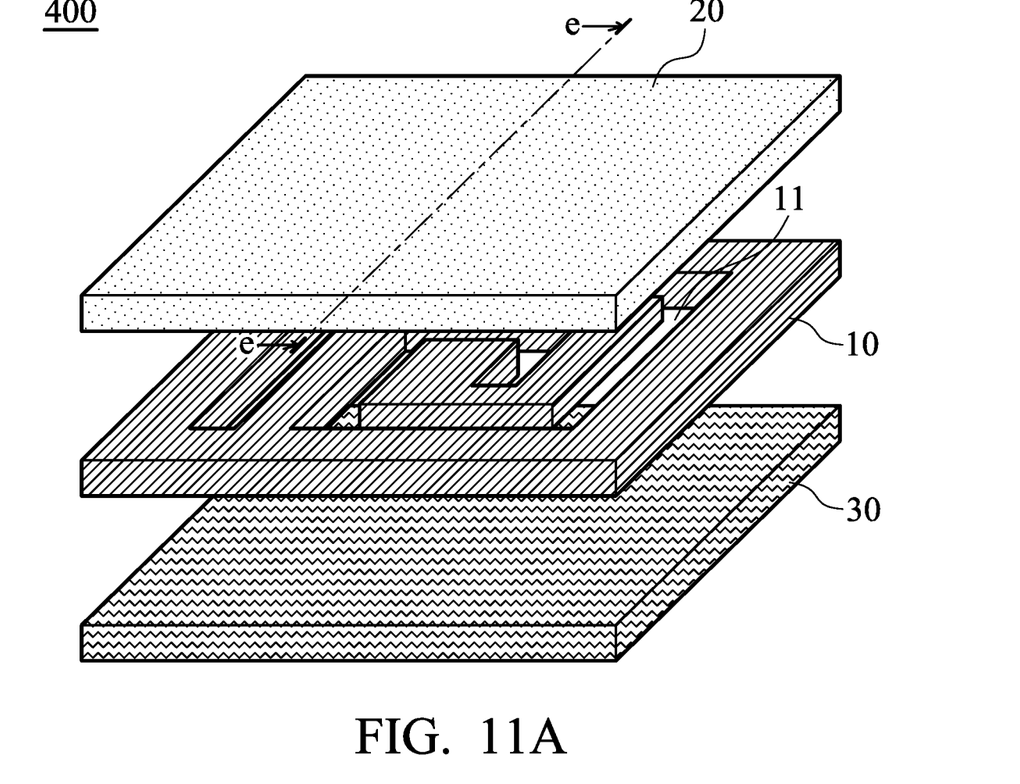
FIG. 11A is a schematic view of the positive electrode 400 shown in FIG. 10 according to embodiments of the disclosure.
Figure 11B:
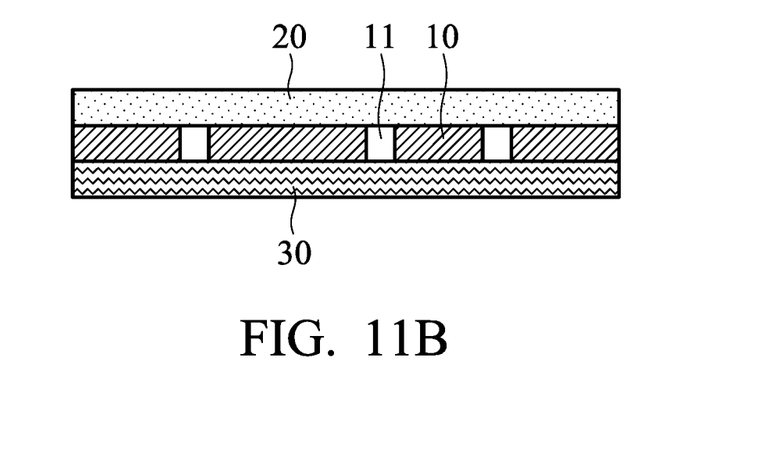
FIG. 11B is a cross-sectional view along line e-e of the positive electrode shown in FIG. 11A according to embodiments of the disclosure.
Figure 12A:
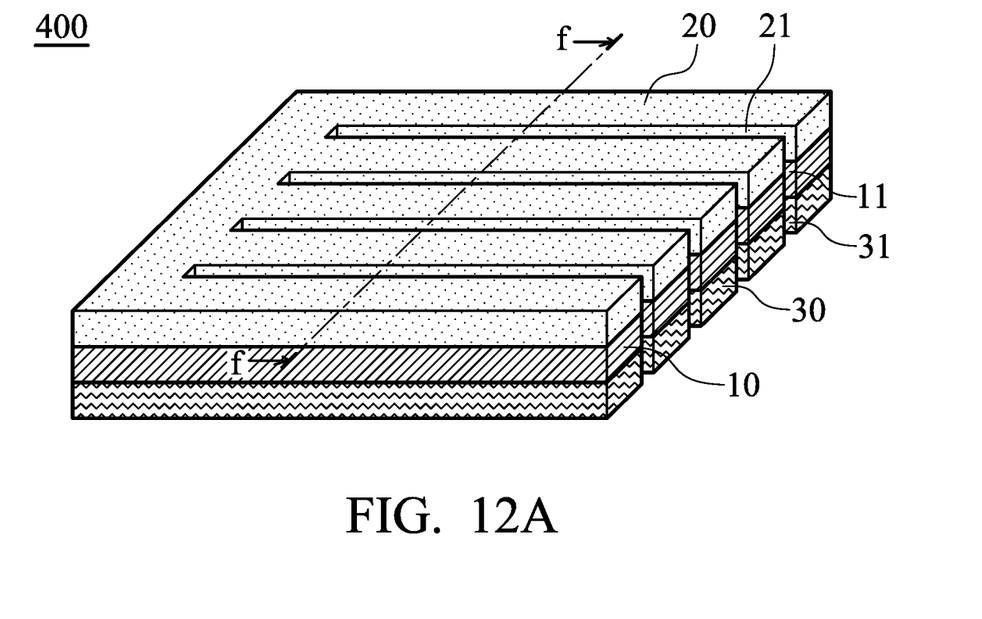
FIG. 12A is a schematic view of the positive electrode as shown in FIG. 10 according to embodiments of the disclosure.
Figure 12B:
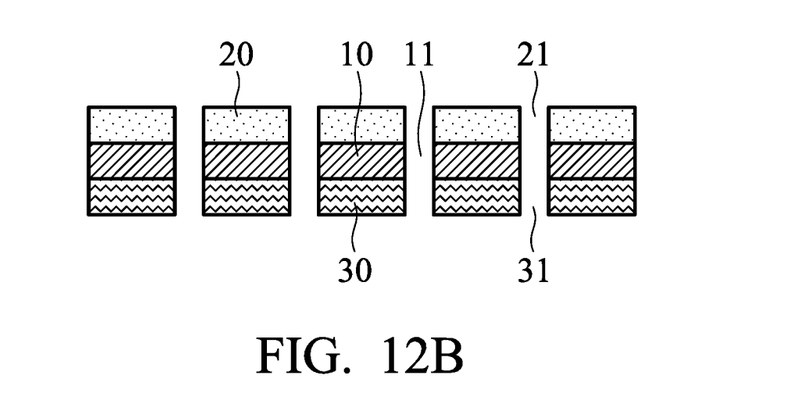
FIG. 12B is a cross-sectional view along line f-f of the positive electrode shown in FIG. 12A.
Figure 12C:
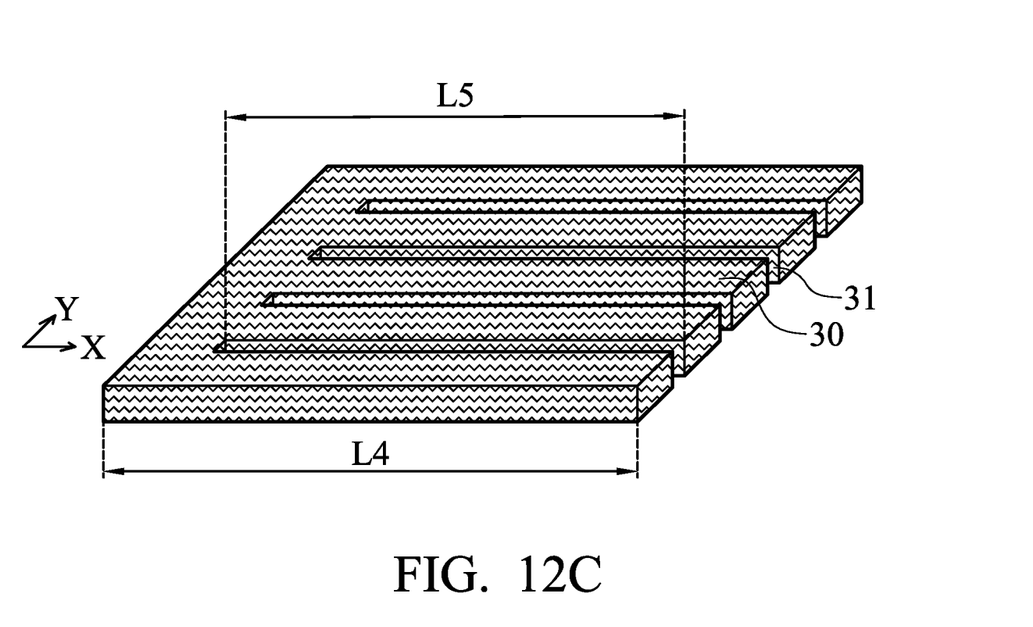
FIG. 12C is a schematic view of the diffusion layer of the positive electrode as shown in FIG. 12A.

According to an embodiment of the disclosure, the positive electrode may further include a diffusion layer besides the current-collecting layer and the active layer, wherein the diffusion layer can have a network structure. Consequently, the diffusion layer can provide a horizontal pathway parallel to the current-collecting layer and the active layer, thereby facilitating the diffusion of the electrolyte. The diffusion layer can have a liquid transmission rate that is greater than 0.1 mm/min, such as between 1 mm/min and 10 mm/min. The diffusion layer can be a conductive material or a non-conductive material, such as carbon paper, carbon net, carbon fiber, nonwoven fabric, fiber cloth, or a combination thereof. FIG. 10 is a schematic view of the positive electrode 400 disclosure according to embodiments of the disclosure. The positive electrode 400 includes a current-collecting layer 10, an active layer 20, and a diffusion layer 30, wherein the active layer 20 is disposed on a surface of the current-collecting layer 10, and the diffusion layer 30 is disposed on another surface opposite the surface of the current-collecting layer 10. Thus, the positive electrode 400 can have a laminated structure represented by active layer 20/current-collecting layer 10/diffusion layer 30. According to another embodiment, the diffusion layer 30 can be disposed on a surface of the active layer 20, and the current-collecting layer 10 can be disposed on another surface opposite the surface of the active layer 20. Thus, the positive electrode can have a laminated structure represented by diffusion layer 30/active layer 20/current-collecting layer 10. According to an embodiment of the disclosure, FIG. 11A is a schematic view of the positive electrode 400 shown in FIG. 10. As shown in FIG. 11A, the current-collecting layer 10 has at least one first through-hole 11. FIG. 11B is a cross-sectional view along line e-e of the positive electrode shown in FIG. 11A according to embodiments of the disclosure. As shown in FIG. 11B, the first through-hole 11 can be a through-hole passing through the current-collecting layer 10. As a result, the electrolyte can be introduced into the active layer 20 via the diffusion layer 30 and the first through-hole 11, thereby facilitating the infiltration of electrolyte into the active layer and increasing the utilization rate of the active material located in the deeper position of the active layer. According to an embodiment of the disclosure, FIG. 12A is a schematic view of the positive electrode 400 shown in FIG. 10. As shown in FIG. 12A, the current-collecting layer 10 can have at least one first through-hole 11, the active layer 20 can have at least one second through-hole 21, and the diffusion layer 30 can have at least one third through-hole 31. FIG. 12B is a cross-sectional view along line f-f of the positive electrode 400 shown in FIG. 12A. As shown in FIG. 12B, the first through-hole 11 is a through-hole passing through the current-collecting layer 10, the second through-hole 21 is a through-hole passing through the active layer 20, and the third through-hole 31 is a through-hole passing through the diffusion layer 30. The projection of the first through-holes 11 onto a reference plane, parallel to the current-collecting layer 10, the active layer 20, and the diffusion layer 30, completely overlaps with the projections of the second through-holes 21 and the third through-holes 31 onto the reference plane. As a result, the electrolyte can contact the active layer 20 via the diffusion layer 30, the first through-hole 11, the second through-hole 21, and the third through-hole 31, thereby facilitating the infiltration of electrolyte into the active layer and increasing the utilization rate of the active material located in the deeper position of the active layer. The shape of the third through-hole 31 is not limited and can be square, rectangular, round, polygonal, irregular-geometric-shaped, or a combination thereof. As shown in FIG. 12A, the third through-hole 31 can be rectangular. The size and/or the distribution of the through-hole can be varied. For example, the through-hole can be unclosed (i.e. the through-hole is not surrounded by the diffusion layer) or closed (i.e. the through-hole is surrounded by the diffusion layer). In one embodiment, the third through-hole 31 can have an aspect ratio between 1:1.5 and 1:10000, such as between 1:1.5 and 1:500, between 1:100 and 1:1000, or 1:1000 and 1:10000. In another embodiment, the ratio of the total of the length L5 (along a cross-section line parallel to X direction or Y direction) of the third through-hole 31 to the length L4 (in the same direction of the cross-section line) of the diffusion layer 30 can be greater than or equal to 0.3 (as shown in FIG. 12C). According to other embodiments of the disclosure, the projection of the first through-holes 11 onto a reference plane, parallel to the current-collecting layer 10, the active layer 20, and the diffusion layer 30, can partially overlap or not overlap with the projections of the second through-holes 21 and the third through-holes 31 onto the reference plane. According to other embodiments of the disclosure, the shapes of the first through-hole 11, the second through-hole 21, and the third through-hole 31 can be the same or different.

Figure 13:
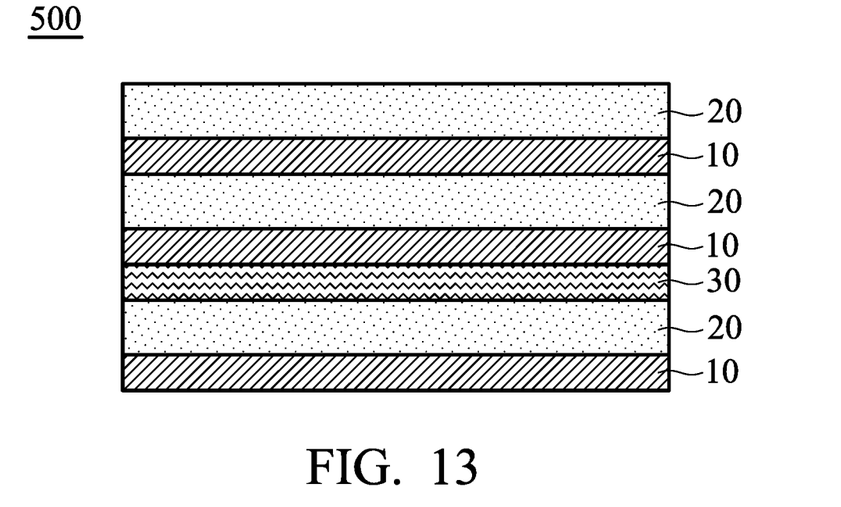
FIGS. 13, 14, and 15 are schematic views of the positive electrode according to embodiments of the disclosure.
Figure 14:
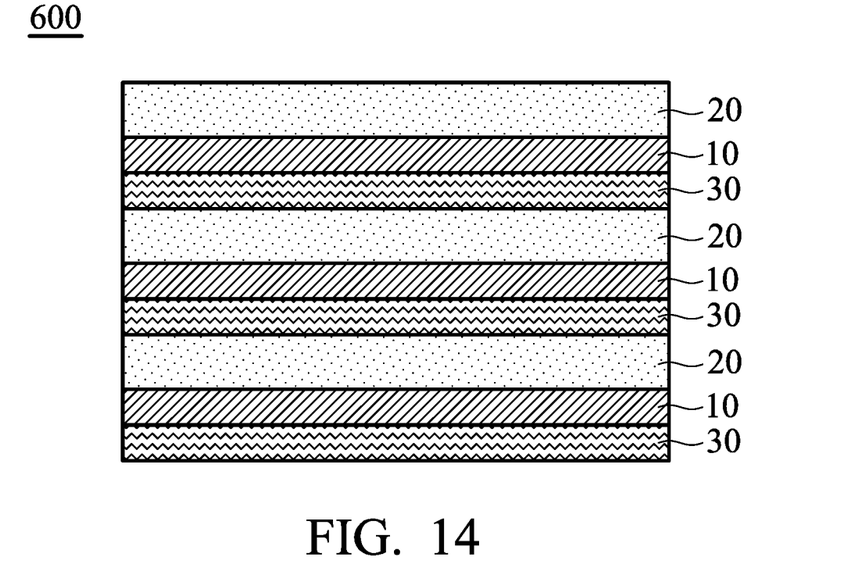
Figure 15:
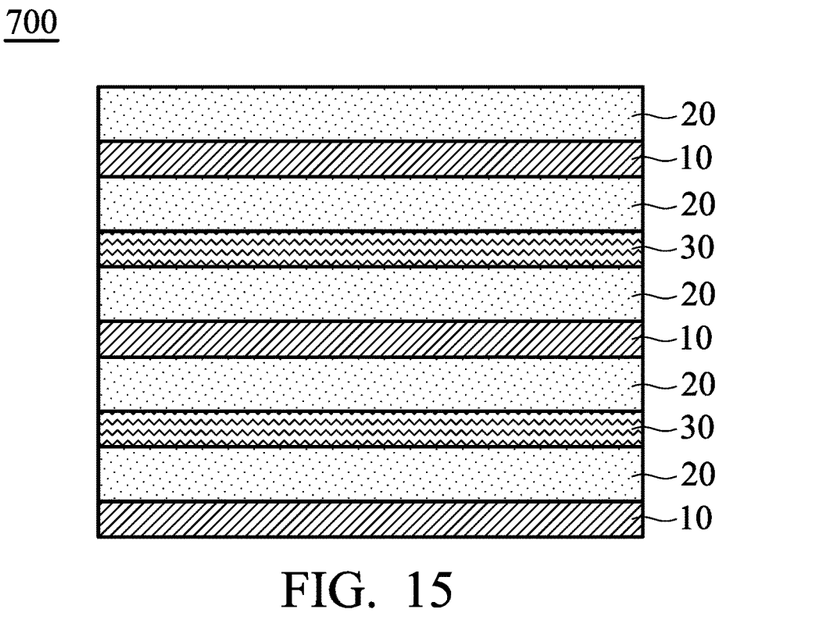

According to an embodiment of the disclosure, the positive electrode can include at least one current-collecting layer, at least one active layer, and at least one diffusion layer, wherein the current-collecting layer, the active layer, and the diffusion layer can be mutually stacked. For example, the stack of current-collecting layers, active layers, and diffusion layers can include a plurality of basic units, wherein the basic unit is constituted by the current-collecting layer and the active layer disposed on the surface of the current-collecting layer. Furthermore, the diffusion layer can be disposed irregularly between the basic units as necessary. FIG. 13 is a schematic view of the positive electrode 500 according to embodiments of the disclosure. As shown in FIG. 13, the positive electrode 500 includes a plurality of basic units constituted by the current-collecting layer 10 and the active layer 20 disposed on the surface of the current-collecting layer, and at least one diffusion layer is disposed irregularly between the basic units. Therefore, the positive electrode 500 can have a laminated structure represented by active layer /current-collecting layer //active layer /current-collecting layer //diffusion layer //active layer /current-collecting layer. Furthermore, the stack of current-collecting layers, active layers, and diffusion layers can include a plurality of basic units, wherein the basic unit is constituted by an active layer 20 disposed on a surface of the current-collecting layer 10, and a diffusion layer 30 disposed on another surface opposite the surface of the current-collecting layer 10. Thus, the basic unit can have a laminated structure represented by active layer /current-collecting layer /diffusion layer, as shown in FIG. 14. Moreover, the stack of current-collecting layers, active layers, and diffusion layers can include a plurality of basic units, wherein the basic unit includes one current-collecting layer and two active layers, and wherein one active layer is disposed on the top surface of the current-collecting layer, and the other active layer is disposed on the bottom surface of the current-collecting layer. At least one diffusion layer is disposed irregularly between the basic units. Thus, the stack can have a laminated structure represented by active layer /current-collecting layer /active layer //diffusion layer // . . . //active layer /current-collecting layer /active layer. Moreover, the stack of current-collecting layers, active layers, and diffusion layers can include at least one first basic unit represented by active layer /current-collecting layer, at least one second basic unit represented by active layer /current-collecting layer /diffusion layer, and/or at least one third basic unit represented by active layer /current-collecting layer /active layer. Therefore, the stack can have a laminated structure represented by active layer /current-collecting layer /diffusion layer //active layer /current-collecting layer /diffusion layer //active layer /current-collecting layer, as shown in FIG. 15.

According to embodiments of the disclosure, the current-collecting layers of the aforementioned stacks may independently include or not include first through-holes, the active layers of the aforementioned stacks may independently include or not include second through-holes, and the diffusion layers of the aforementioned stacks may independently include or not include third through-holes as necessary.

Figure 16:
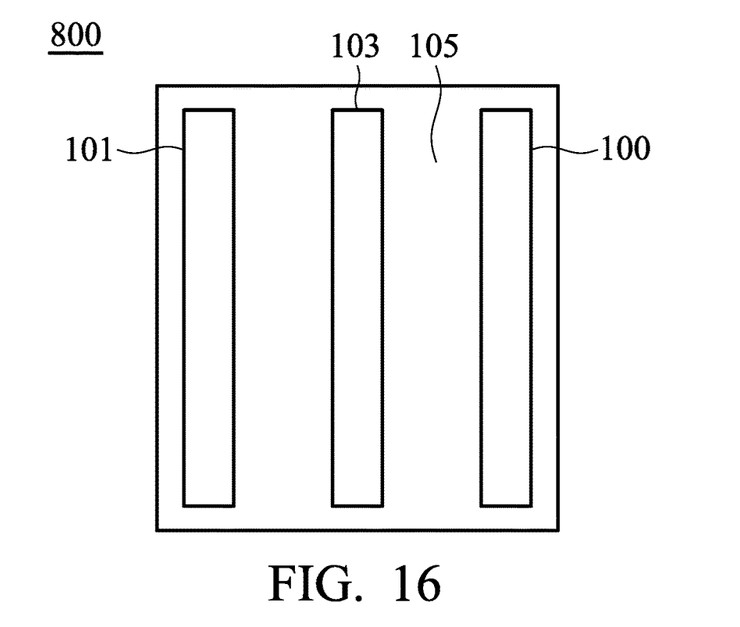
FIG. 16 is a schematic view of the metal-ion secondary battery according to embodiments of the disclosure.

According to embodiments of the disclosure, the positive electrode of the disclosure can be applied in a metal-ion secondary battery. FIG. 16 is a schematic view of the metal-ion secondary battery according to embodiments of the disclosure. As shown in FIG. 16, the metal-ion secondary battery 800 includes a negative electrode 101, a separator 103, and the aforementioned positive electrode 100, wherein the separator 103 is disposed between the negative electrode 101 and the positive electrode 100.

The metal-ion secondary battery 800 can include an electrolyte 105, wherein the electrolyte 105 is disposed between the negative electrode 101 and the positive electrode 100. The aforementioned metal-ion secondary battery 800 can be an aluminum-ion battery, and the negative electrode 101 can include aluminum metal or aluminum although other types of metal ion batteries are encompassed by the disclosure. According to embodiments of the disclosure, the negative electrode 101 can include one or more of an alkali metal (e.g., lithium, potassium, sodium, and so forth), an alkaline earth metal (e.g., magnesium, calcium, and so forth), a transition metal (e.g., zinc, iron, nickel, cobalt, and so forth), a main group metal or metalloid (e.g., aluminum, silicon, tin, and so forth), and a metal alloy of two or more of the foregoing elements (e.g., an aluminum alloy). According to embodiments of the disclosure, the separator 103 can include glass fiber, polyethylene (PE), polypropylene (PP), nonwoven fabric, or paper. The electrolyte 105 can include ionic liquid. Examples of ionic liquids include urea, N-methylurea, choline chloride, ethylchlorine chloride, alkali halide, dimethyl sulfoxide, methylsulfonylmethane, alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or mixtures thereof. For example, the electrolyte can correspond to, or can include, a mixture of an aluminum halide and an ionic liquid, and a molar ratio of the aluminum halide to the ionic liquid is at least about 1.1 or at least about 1.2, and is up to about 1.5, up to about 1.8, or more, such as where the aluminum halide is $AlCl_3$, the ionic liquid is 1-ethyl-3-methylimidazolium chloride, and the molar ratio of the aluminum chloride to 1-ethyl-3-methylimidazolium chloride is at least about 1.2. An ionic liquid electrolyte can be doped (or have additives added) to increase electrical conductivity and lower viscosity, or it can be otherwise altered to yield compositions that favor the reversible electrodeposition of metals.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

First, a current-collecting layer (carbon paper having a thickness of 220 μm) was provided. After drying the current-collecting layer, a coating of a composition was formed on the top surface of the current-collecting layer by coating. The composition included a multi-layered graphene (sold by Graphage Inc. with trade No. P-ML20, having a specific surface area 50 m$^2$/g) and a solvent (n-methyl pyrrolidinone). Next, the current-collecting layer was baked in a vacuum furnace at 80° C. After baking, an active layer (having a thickness of 0.1 mm) was formed on the top surface of the current-collecting layer. Next, the obtained structure was cut, obtaining a lamination, represented by active layer /current-collecting layer, having a size of 35 mm×70 mm.

Next, the lamination was chiseled using a blade to form rectangular through-holes (having a size of 0.1 mm×30 mm) passing through the current-collecting layer and the active layer, obtaining a graphite electrode similar to the structure shown in FIG. 6A. The electrode had a porosity (for a single layer) of about 1.2%, and had a graphite amount per unit area (for a single layer) of about 2.1 mg/cm$^2$.

Next, an aluminum foil (with a thickness of 0.025 mm, manufactured by Alfa Aesar) was cut to obtain aluminum electrodes (having a size of 35 mm×70 mm). Next, separators (with trade No. Whatman GFA) were provided. Next, the aluminum electrode, the separator, the graphite electrode, the separator, and the aluminum electrode were placed in sequence and sealed within an aluminum plastic pouch. Next, an electrolyte (including aluminum chloride (AlCl$_3$) and 1-ethyl-3-methylimidazolium chloride ([EMIm]Cl, wherein the molar ratio of AlCl$_3$ to [EMIm]Cl was about 1.4:1) was injected into the aluminum plastic pouch, obtaining the aluminum-ion battery (1).

Next, the aluminum-ion battery (1) was charged (to about 2.45 V) and discharged (to about 1 V) at a current density of about 1000 mA/g by a NEWARE battery analyzer to analyze the performance thereof, and the results are shown in Table 1.

Example 2

First, a current-collecting layer (carbon paper having a thickness of 220 μm) was provided. After drying the current-collecting layer, a coating of a composition was formed on the top surface of the current-collecting layer by coating. The composition included a multi-layered graphene (sold by Graphage Inc. with trade No. P-ML20, having a specific surface area 50 m$^2$/g) and a solvent (n-methyl pyrrolidinone). Next, the current-collecting layer was baked in a vacuum furnace at 80° C. After baking, an active layer (having a thickness of 0.1 mm) was formed on the top surface of the current-collecting layer. Next, the obtained structure was cut, obtaining a first lamination, represented by active layer /current-collecting layer, having a size of 35 mm×70 mm. Next, three first laminations were stacked, forming a second lamination.

Next, the second lamination was chiseled using a blade to form rectangular through-holes (having a size of 0.1 mm×30 mm) passing through the current-collecting layer and the active layer, obtaining a graphite electrode similar to the structure shown in FIG. 6A. The electrode had a porosity (for a single layer) of about 1.2%, and had a graphite amount per unit area (for a single layer) of about 1.72 mg/cm$^2$.

Next, an aluminum foil (with a thickness of 0.025 mm, manufactured by Alfa Aesar) was cut to obtain aluminum electrodes (having a size of 35 mm×70 mm). Next, separators (with trade No. Whatman GFA) were provided. Next, the aluminum electrode, the separator, the graphite electrode, the separator, and the aluminum electrode were placed in sequence and sealed within an aluminum plastic pouch. Next, an electrolyte (including aluminum chloride (AlCl$_3$) and 1-ethyl-3-methylimidazolium chloride ([EMIm]Cl, wherein the molar ratio of AlCl$_3$ to [EMIm]Cl was about 1.4:1) was injected into the aluminum plastic pouch, obtaining the aluminum-ion battery (2).

Next, the aluminum-ion battery (2) was charged (to about 2.45 V) and discharged (to about 1 V) at a current density of about 1000 mA/g by a NEWARE battery analyzer to analyze the performance thereof, and the results are shown in Table 1.

Example 3

First, a current-collecting layer (carbon paper having a thickness of 220 μm) was provided. After drying the current-collecting layer, a coating of a composition was formed on the top surface of the current-collecting layer by coating. The composition included a multi-layered graphene (sold by Graphage Inc. with trade No. P-ML20, having a specific surface area 50 m$^2$/g) and a solvent (n-methyl pyrrolidinone). Next, the current-collecting layer was baked in a vacuum furnace at 80° C. After baking, an active layer (having a thickness of 0.1 mm) was formed on the top surface of the current-collecting layer. Next, a carbon paper (having a thickness of 0.2 mm) serving as a diffusion layer was disposed on the bottom surface of the current-collecting layer. Next, the obtained structure was cut, obtaining a first lamination, represented by active layer /current-collecting layer /diffusion layer, having a size of 35 mm×70 mm. Next, three first laminations were stacked, forming a second lamination.

Next, the second lamination was chiseled using a blade to form rectangular through-holes (having a size of 0.1 mm×30 mm) passing through the current-collecting layer, the active layer, and the diffusion layer, obtaining a graphite electrode similar to the structure shown in FIG. 6A. The electrode had a porosity (for a single layer) of about 1.2%, and had a graphite amount per unit area (for a single layer) of about 2.1 mg/cm$^2$.

Next, an aluminum foil (with a thickness of 0.025 mm, manufactured by Alfa Aesar) was cut to obtain aluminum electrodes (having a size of 35 mm×70 mm). Next, separators (with trade No. Whatman GFA) were provided. Next, the aluminum electrode, the separator, the graphite electrode, the separator, and the aluminum electrode were placed in sequence and sealed within an aluminum plastic pouch. Next, an electrolyte (including aluminum chloride (AlCl$_3$) and 1-ethyl-3-methylimidazolium chloride ([EMIm]Cl, wherein the molar ratio of AlCl$_3$ to [EMIm]Cl was about 1.4:1) was injected into the aluminum plastic pouch, obtaining the aluminum-ion battery (3).

Next, the aluminum-ion battery (3) was charged (to about 2.45 V) and discharged (to about 1 V) at a current density of about 1000 mA/g by a NEWARE battery analyzer to analyze the performance thereof, and the results are shown in Table 1.

Comparative Example 1

First, a current-collecting layer (carbon paper having a thickness of 220 μm) was provided. After drying the current-collecting layer, a coating of a composition was formed on the top surface of the current-collecting layer by coating. The composition included a multi-layered graphene (sold by Graphage Inc. with trade No. P-ML20, having a specific surface area 50 $m^2/g$) and a solvent (n-methyl pyrrolidinone). Next, the current-collecting layer was baked in a vacuum furnace at 80° C. After baking, an active layer (having a thickness of 0.1 mm) was formed on the top surface of the current-collecting layer. Next, the obtained structure was cut, obtaining a graphite electrode, represented by active layer /current-collecting layer, having a size of 35 mm×70 mm.

Next, an aluminum foil (with a thickness of 0.025 mm, manufactured by Alfa Aesar) was cut to obtain aluminum electrodes (having a size of 35 mm×70 mm). Next, separators (with trade No. Whatman GFA) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio of $AlCl_3$ to [EMIm]Cl was about 1.4:1) was injected into the aluminum plastic pouch, obtaining the aluminum-ion battery (4).

Next, the aluminum-ion battery (4) was charged (to about 2.45 V) and discharged (to about 1 V) at a current density of about 1000 mA/g by a NEWARE battery analyzer to analyze the performance thereof, and the results are shown in Table 1.

Comparative Example 2

First, a current-collecting layer (carbon paper having a thickness of 220 μm) was provided. After drying the current-collecting layer, a coating of a composition was formed on the top surface of the current-collecting layer by coating. The composition included a multi-layered graphene (sold by Graphage Inc. with trade No. P-ML20, having a specific surface area 50 $m^2/g$) and a solvent (n-methyl pyrrolidinone). Next, the current-collecting layer was baked in a vacuum furnace at 80° C. After baking, an active layer (having a thickness of 0.25 mm) was formed on the top surface of the current-collecting layer. Next, the obtained structure was cut, obtaining a graphite electrode, represented by active layer /current-collecting layer, having a size of 35 mm×70 mm.

Next, an aluminum foil (with a thickness of 0.025 mm, manufactured by Alfa Aesar) was cut to obtain aluminum electrodes (having a size of 35 mm×70 mm). Next, separators (with trade No. Whatman 934-AH) were provided. Next, the aluminum electrode, the separator, the graphite electrode, the separator, and the aluminum electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio of $AlCl_3$ to [EMIm]Cl was about 1.4:1) was injected into the aluminum plastic pouch, obtaining the aluminum-ion battery (5).

Next, the aluminum-ion battery (5) was charged (to about 2.45 V) and discharged (to about 1 V) at a current density of about 1000 mA/g by a NEWARE battery analyzer to analyze the performance thereof, and the results are shown in Table 1.

TABLE 1

|  | graphite amount per unit area for a single layer (mg/cm²) | total amount of graphite (mg/cm²) | structure of graphite electrode | porosity for a single layer (%) | specific capacity (mAh/g) | total capacity (mAh) @10 C |
|---|---|---|---|---|---|---|
| Example 1 | 2.3 | 57 | [active layer/current-collecting layer] × 1 | 1.2 | 80.7 | 4.6 |
| Example 2 | 1.72 | 127 | [active layer/current-collecting layer] × 3 | 1.2 | 61.4 | 7.8 |
| Example 3 | 2.1 | 150 | [active layer/current-collecting layer/diffusion layer] × 3 | 1.2 | 63.5 | 9.53 |
| Comparative Example 1 | 2 | 59 | [active layer/current-collecting layer] × 1 | — | 72.1 | 4.25 |
| Comparative Example 2 | 6.32 | 155 | [active layer/current-collecting layer] × 1 | — | 23.7 | 3.68 |

As shown in Table 1, compared with Comparative Example 2, the contact area between the active layer and the electrolyte (i.e. ionic liquid) in the aluminum-ion battery (2) of Example 2 is higher due to the multiple thin active layers (i.e. graphite layers). Therefore, the utilization rate of the graphite layer is increased, resulting in improving the specific capacity and the total capacity of the aluminum-ion battery (2).

On the other hand, compared with Comparative Example 1, a pathway for the electrolyte (i.e. ionic liquid) is provided and the active material (graphite) is infiltrated rapidly by the electrolyte due to the through-holes within the current-collecting layer and the active layer. Therefore, the utilization rate of the graphite layer is increased, resulting in improving the specific capacity and the total capacity of the aluminum-ion battery (1). In addition, due to the network structure of the diffusion layer, the diffusion layer provides a horizontal pathway parallel to the current-collecting layer and the active layer, thereby facilitating the diffusion of the electrolyte. Therefore, the specific capacity and the total capacity of the battery of the disclosure are improved. Furthermore, the total capacity of batteries as disclosed in Examples 1-3 were measured at 10 C rate. As the results in Table 1 show, the positive electrode of the disclosure can be employed by a metal-ion secondary battery capable of efficiently charging and discharging.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A metal-ion secondary battery, comprising:
a positive electrode, a negative electrode, a separator, and an electrolyte, wherein the separator is disposed between the positive electrode and the negative electrode, and wherein the positive electrode comprises:
at least one current-collecting layer; and
at least one active layer, wherein the current-collecting layer and the active layer are mutually stacked, and the current-collecting layer has at least one first through-hole; and
at least one diffusion layer, wherein the diffusion layer has a network structure and the diffusion layer is carbon paper, carbon net, carbon fiber, nonwoven fabric, fiber cloth or a combination thereof,
wherein the active layer has at least one second through-hole, and wherein the diffusion layer directly contacts the current-collecting layer.

2. The metal-ion secondary battery as claimed in claim 1, wherein the negative electrode comprises aluminum metal or aluminum alloy.

3. The metal-ion secondary battery as claimed in claim 1, wherein the current-collecting layer has a porosity between 0.1% and 50%.

4. The metal-ion secondary battery as claimed in claim 1, wherein the first through-hole has an aspect ratio between 1:1.5 and 1:10000.

5. The metal-ion secondary battery as claimed in claim 1, wherein the first through-hole is a square hole, a rectangle-shaped hole, a round hole, a polygon-shaped hole, an irregular-geometric-shaped hole, or a combination thereof.

6. The metal-ion secondary battery as claimed in claim 1, wherein the active layer has a porosity between 0.1% and 50%.

7. The metal-ion secondary battery as claimed in claim 6, wherein the second through-hole is a square hole, a rectangle-shaped hole, a round hole, a polygon-shaped hole, an irregular-geometric-shaped hole, or a combination thereof.

8. The metal-ion secondary battery as claimed in claim 6, wherein a projection of the first through-hole onto a reference plane parallel to the current-collecting layer and the active layer completely or partially overlaps with, or does not overlap with a projection of the second through-hole onto the reference plane.

9. The metal-ion secondary battery as claimed in claim 1, wherein the active layer comprises an active material.

10. The metal-ion secondary battery as claimed in claim 9, wherein the active material comprises expanded graphite, nature graphite, artificial graphite, mesophase carbon microbeads, pyrolytic graphite, foamed graphite, layered graphene, flake graphite, or a combination thereof.

11. The metal-ion secondary battery as claimed in claim 9, wherein the active material comprises carbon material, nanoscale metal line, microscale metal line, nanoscale transition metal particle, microscale transition metal particle, or a combination thereof.

12. The metal-ion secondary battery as claimed in claim 1, wherein the diffusion layer is disposed on a surface of the current-collecting layer reverse to the active layer.

13. The metal-ion secondary battery as claimed in claim 1, wherein the diffusion layer has at least one third through-hole, and the third through-hole is a square hole, a rectangle-shaped hole, a round hole, a polygon-shaped hole, an irregular-geometric-shaped hole, or a combination thereof.

14. The metal-ion secondary battery as claimed in claim 13, wherein a projection of the first through-hole onto a reference plane parallel to the current-collecting layer, the active layer, and the diffusion layer completely or partially overlaps with, or does not overlap with a projection of the second through-hole onto the reference plane and/or a projection of the third through-hole onto the reference plane.

15. The metal-ion secondary battery as claimed in claim 1, wherein the current-collecting layer comprises a metal foil, conductive adhesive, conductive polymer, carbon paper, alloy, or carbon cloth.

16. The metal-ion secondary battery as claimed in claim 1, wherein the thickness of the current-collecting layer is between 1 μm and 200 μm.

17. The metal-ion secondary battery as claimed in claim 1, wherein the electrolyte comprises an ionic liquid.

* * * * *